April 22, 1958
C. D. COFFEY
2,831,504
COMBINED SNAP-ACTING AND MODULATING VALVE
Filed May 11, 1953
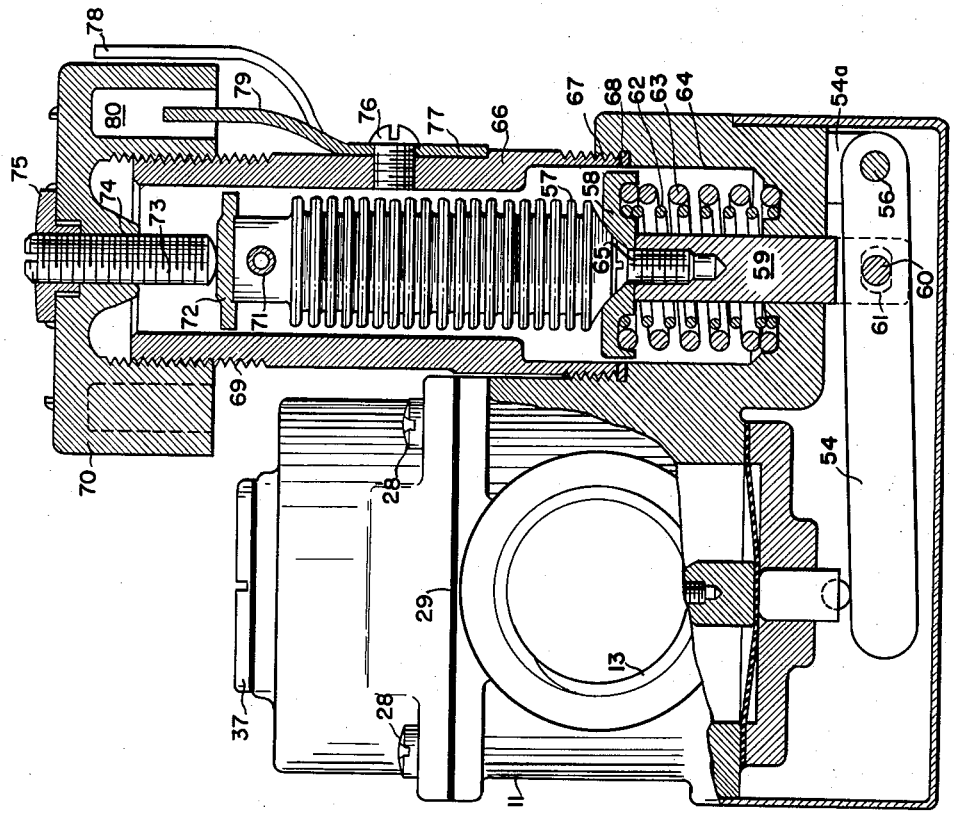
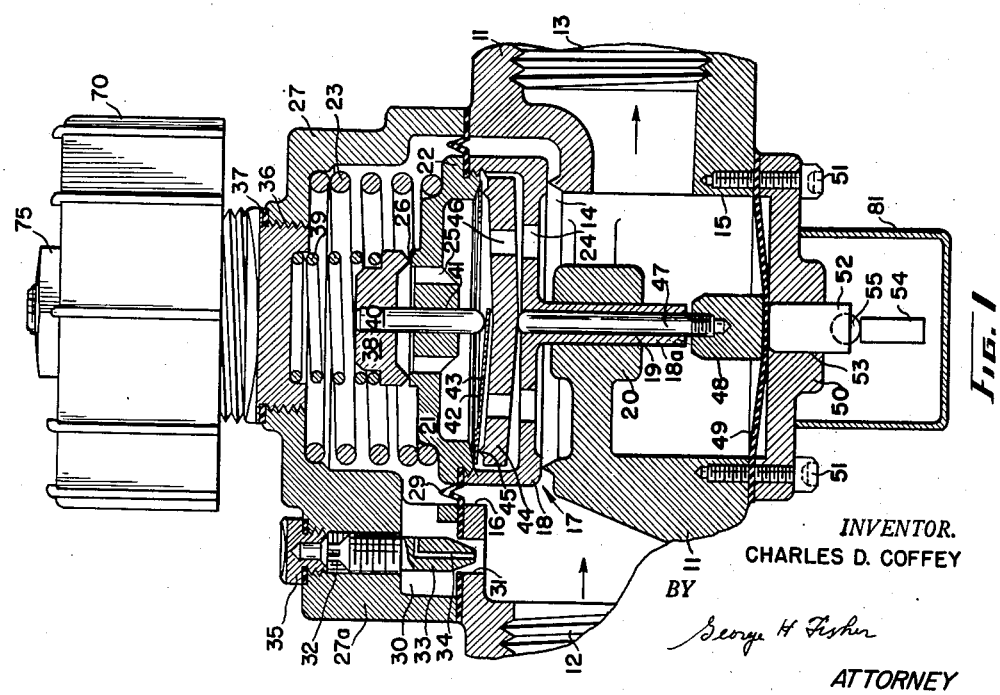
INVENTOR.
CHARLES D. COFFEY
BY
George H Fisher
ATTORNEY United States Patent Office 2,831,504
Patented Apr. 22, 1958

2,831,504
COMBINED SNAP-ACTING AND MODULATING VALVE

Charles D. Coffey, Inglewood, Calif., assignor to Minneapolis-Honeywell Regulator Company, Minneapolis, Minn., a corporation of Delaware Application May 11, 1953, Serial No. 354,303

9 Claims. (Cl. 137—630.15)

This invention relates to combined snap-acting and modulating valves generally and, more specifically, to a combined snap-acting and modulating gas valve that is thermostatically operated to regulate the flow of gas to a fuel burner.

One of the objects of this invention is to provide a very compact and inexpensive valve that will function to provide quick opening and closing of the valve to and from a minimum flow position with modulation between the minimum flow position and the full on position of the valve.

Another object of the invention is to provide coaxially arranged snap-acting and modulating valves which are sequentially actuated by a common condition responsive means, such as a fluid filled temperature responsive bulb and bellows.

Still another object of the invention is to provide a snap-acting valve concentric with and controlling the passage through a modulating valve, having a diaphragm seal between it and the valve body, and an adjustable bypass from the snap-acting valve to the outlet of the valve, around the modulating valve.

Still other objects of the invention will become apparent upon reading the following detailed description of the invention in conjunction with the accompanying drawing herewith.

Figure 1 of the drawing is a cross sectional view of the invention taken along the longitudinal axis of the valve body and with portions thereof broken away.

Figure 2 of the drawing is an end view of the valve with a portion thereof shown in cross section along the vertical axis of the temperature responsive mechanism for actuating the valve.

The valve body is generally designated by the reference numeral 11. It has a threaded inlet 12 and a threaded outlet 13 and a valve seat 14 therebetween. The bottom of the body 11 has an opening 15 for a purpose to be hereinafter described, and another larger opening 16 substantially in coaxial alignment with the valve seat 14 and the opening 15.

A main or modulating valve, generally designated by the reference numeral 17, has a cup-shaped lower section 18 with a downwardly extending sleeve-like stem 18a extending through a bore 19 in a "spider" guide 20, located in the discharge side of the valve seat. The portion 18 is internally threaded at its upper edge and supports an upper, inverted cup-shaped portion 21, that is externally threaded at its lower edge and has an annular shoulder 22 that overlies the upper edge of the valve portion 18. The valve 17 is biased against the valve seat 14 at its lower edge by means of a coiled compression spring 23. The bottom of the lower valve portion 18 has a plurality of apertures 24 therein for the flow of gas therethrough while the upper valve portion 21 has a plurality of apertures 25 therein for the flow of gas therethrough. Encircling the upper ends of the passages 25 and forming a boss on the upper surface of the valve portion 21, is a valve seat 26 for cooperation with a valve to be presently described.

A cover 27 is bolted to the valve body by means of bolts 28 and clamps a diaphragm 29 therebetween. The diaphragm 29 has a large opening therethrough, the marginal edge of which is clamped between the shoulder 22 and valve portion 21 and the upper edge of valve portion 18. The cover has a thickened portion 27a with a passage 30 formed therein that extends from the interior of the housing 27 to the top of a portion of the diaphragm 29 in alignment with a passage 31 formed in the valve body and the diaphragm 29. The passages 31 and 30 establish communication between the inlet 12 and the interior of the cover 27. A bore 32, extending from the exterior of the cover 27 to the passage 30, in axial alignment with the bore 31, is threaded at its lower end for adjustably holding a needle valve 33. The needle valve is adjustable with respect to the bore 31, at the diaphragm end thereof, to regulate fuel flow between inlet 12 and the interior of cover 27. An L-shaped passage 34, formed in the needle valve 33, provides a minimum flow adjustment for the needle valve. The upper or outer end of the bore 32 is screw threaded and receives a sealing plug 35. A large threaded opening 36 in the cover 27 and in axial alignment with the valve 17, is sealed by a plug 37.

A relatively small diameter valve 38 is resiliently biased into engagement with the valve seat 26 by means of a compression coil spring 39 extending between the valve 38 and the sealing plug 37. This valve has a valve stem 40 that is axially slidable in a bore 41 extending through the valve portion 21 and terminating approximately halfway between the inner surfaces of the valve portions 18 and 21. A conventional washer-shaped snap disc 42, having an inwardly extending radial tongue 43, abuts the lower edge of the valve portion 21 at its outer peripheral edge, with the free end of the tongue 43 engaging the adjacent end of the valve stem 40. A snap disc actuator 44, having an annular rib 45 formed thereon and of smaller diameter than the outside diameter of the snap disc 42, is axially movable in the lower valve portion 18 for moving the snap disc from one side to the other, to open and close the valve 38 against the bias of its spring 39. The actuator 44 has a plurality of openings 46 therein for the free passage of gas through the valve 17 when the valve 38 is off of valve seat 26.

The snap disc actuator 44 is adapted to be moved axially in the valve portion 18 by means of a stem 47 extending through the sleeve-like guide stem 18a of valve 17. The lower end of the stem 47 is screw threaded into an abutment head 48 that engages the inner surface of a diaphragm 49 extending across the opening 15 in the valve body 11. The diaphragm is sealingly clamped to the valve body by means of a plate 50 secured to the valve body by means of bolts 51.

A plunger 52, axially slidable in a bore 53 extending through the plate 50, is adapted to engage and actuate the diaphragm 49 and abutment 48 in response to movement of an actuating lever 54 bearing against a ball bearing 55 imbedded in the other end of the plunger 52. The lever 54, which may best be seen in Figure 2 of the drawing, is secured to a pair of spaced arms 54a, formed on the valve body 11, by means of a pivot 56 extending through said spaced arms 54a and the lever 54. The lever is adapted to be actuated by means of a bellows 57 bearing against the head 58 of a plunger 59, which is bifurcated at its lower end and pivoted to the lever 54 by means of a pivot 60. The pivot holes in the stem 59 are slightly elongated along the axis of the lever 54 to allow for a slight amount of sliding movement of the pivot 60 lengthwise of the lever 54 as it pivots about the pivot 56. The upper end of the plunger 59 has a threaded axial bore therein for the reception of a screw extending through the head 58 to hold it on the stem 59. A pair of different diameter compression spring 62 and 63 surround the stem 59 and extend between the head 58 and the bottom of the recess 64. Two springs are used to reduce the spring rate and they may be of the same or unequal strength. The springs 62 and 63 are sufficiently strong that, if the bellows 57 permits, the lever 54 will be moved clockwise about the pivot 56 to open the small valve 38 against the bias of its spring 39 and then open the valve 17 against the bias of its spring 23, by the upper end of the head 48 engaging the lower end of the stem 18a.

The bellows 57 is enclosed in a sleeve 66 screw threaded at its lower end into a threaded socket 67 surrounding the open end of the recess 64 and into clamping engagement with a washer 68. The upper end of the sleeve 66 is screw threaded at 69 and adjustably supports a control knob 70 thereon. The upper end also has a longitudinally extending slot (not shown) through which a tube 71 extends from the upper end of the bellows 57 to a temperature sensing bulb (not shown) adapted to be positioned in a space, the temperature of which is to be controlled. A centering cap 72 rests on the upper end of the bellows 57 and is adapted to be adjusted relative to the control dial or knob 70 by means of a calibrating screw 73 extending through a threaded bore 74 in the knob 70. A lock nut 75 is threaded on the calibrating screw 73 to lock it in its adjusted relationship with respect to the knob.

Secured to the side of the sleeve 66, by means of a screw 76, is a bracket member 77 having an upwardly extending pointer arm 78, for indicating the adjusted position of the knob with respect to the pointer arm 78 as a reference point, and a stop arm 79 extending upwardly into an arcuate groove 80, extending substantially entirely around the knob 70, for engagement with the ends of the arcuate groove to stop the knob at its minimum and maximum flow adjustment positions. When the knob is rotated in a direction to compress the bellows 57, it is obvious that the temperature at which the small valve 38 will operate will be lowered and as the knob is rotated in a counterclockwise direction, the control temperature of the valve will be raised. Therefore, indicia (not shown) on the dial or control knob may be in the form of degrees of temperature within any desired temperature range that the knob may be calibrated for, by adjustment of the calibrating screw 73.

*Operation*

With the above described valve installed in a heating system, with the inlet 12 connected to a source of fuel, the outlet 13 connected to the burner of the heating system, and the temperature sensing bulb (not shown) positioned in the space the temperature of which is to be maintained, no gas will be flowing to the burner with the elements of the valve in their illustrated positions. Upon a decrease in temperature around the temperature sensing bulb, below that which the knob or dial is set with respect to the pointer 78, the bellows 57 will contract due to the decrease in volume of the fluid within the bellows, and permit the springs 62 and 63 to pivot the lever 54 clockwise about the pivot 56. This will cause the lever 54 to move the plunger 52 against the diaphragm 49 and head 48 to first move the stem 47 to actuate the snap-acting mechanism and open the valve 38 quickly to its full open position. The space between the head 48 and the lower end of stem 18a is so adjusted that very little additional movement of the head 48 after the snap disc has opened the valve 38 takes place before the head 48 engages the end of stem 18a to start lifting the main valve 17. This adjustment prevents overstressing and permanent damage to the snap disc. When the snap valve 38 has been opened, gas will flow from the inlet 12 through the passage 31 and 30 and through the openings 25, 46 and 24 to the outlet 13 and to the main burner.

The rate of this fuel flow is determined by the position of the needle valve 33 with respect to the opening 31, there always being a minimum flow as determined by the L-shaped passage 34 through the needle valve. It is thus seen that by the proper adjustment of the needle valve 33 the snap opening of the valve 38 will supply a predetermined minimum gas flow which will assure proper ignition of the main burner by its igniting means, such as a standing pilot.

The degree of opening of the main valve 17, or whether the main valve 17 opens or not, depends upon how much the temperature drops below the control point. It may be that the minimum flow provided by the snap valve will be sufficient to bring the room temperature up above the control point without the main valve ever opening. This may take place when the outside temperature is only slightly below the room temperature, assuming that the bulb is sensing room temperature. It will be observed that after the snap valve 38 has opened and the head 48 has engaged the lower end of sleeve stem 18a, the springs 62 and 63 overcome the bias of springs 39 and 23 in moving both the valve 38 and the valve 17 axially while in their spaced relationship. The movement of the valve 17 is permitted due to the flexing of the diaphragm 29.

Assuming that the valve 38 and the valve 17 have moved to an open position, the heat from the burner will raise the temperature around the temperature sensing bulb and cause expansion of the fluid in the bulb and bellows so as to force the lever 54 in a counterclockwise direction against the bias of springs 62 and 63. This causes the plunger 52 to relieve the pressure against the diaphragm 49 and head 48 and enable the spring 23 to close the main valve 17. Further expansion of the bellows will enable the spring 39 to load the snap disc 42 to the point where it will snap to the position which will enable the spring 39 to snap the valve 38 from its full open position to its closed position.

From the above description of my invention, it may be readily seen that I have provided a very compact, simple and inexpensive combination snap-acting and modulating valve that will operate to insure reliable and safe operation of a fuel burner of a heating system. Also, it is deemed to be apparent that modifications may be made in the above described preferred modification of the invention without departing from the spirit of the invention. Therefore, it is to be understood that the scope of the invention is to be determined solely from the appended claims.

I claim as my invention:

1. In a fuel valve, the combination comprising a valve body having an inlet and an outlet with a partition therebetween, a passage through said partition having a valve seat at one end thereof, said valve body having a large opening and a small opening in a side wall thereof, an adjustable valve controlling fuel flow through said small opening, a diaphragm extending across said large opening and having an aperture therein, a passage extending from said adjustable valve to the top of said diaphragm, a first valve positioned to cover and uncover said valve seat and having an aperture therein, means biasing said first valve toward said valve seat, said first valve also being positioned in the aperture in said diaphragm and sealingly secured at its circumferential edge to the marginal edge of said aperture in said diaphragm, a second valve positioned to cover and uncover said aperture in said first valve, means biasing said second valve towards said first valve, condition responsive means operably associated with said first and second valves to first open said second valve and then additionally open said first valve upon a further change in condition in the same direction, and a cover sealingly engaging said valve body and enclosing all of said valves.

2. A combination fuel valve comprising a valve body having an inlet and an outlet with a partition therebetween, a passage through said partition having a valve seat at one end thereof, said valve body having a first opening and a second opening in a side wall thereof, a chamber over said openings establishing communication therebetween, a diaphragm extending across said first opening and having an aperture therein, a first valve having an aperture therein positioned to cover and uncover said valve seat, said first valve being positioned in the aperture in said diaphragm and sealingly secured at its circumferential edge to the marginal edge of said aperture in said diaphragm, means resiliently biasing said first valve towards said valve seat, a second valve positioned to cover and uncover said aperture in said first valve, means resiliently biasing said second valve towards said first valve, means operably associated with said first and second valves to first open said second valve to provide minimum flow of fuel and then additionally open said first valve in accordance with further condition changes in the same direction, and a cover sealingly engaging said valve body and enclosing all of said valves.

3. In a fuel valve, the combination comprising a valve body having an inlet and an outlet with a partition therebetween, a passage through said partition having a valve seat at one end thereof, said valve body having a large opening and a small opening in a side wall thereof, a chamber over said openings establishing communication therebetween, a diaphragm extending across said large opening and having an aperture therein, a first valve normally biased to cover said valve seat and having an aperture therein, said first valve also being positioned in the aperture in said diaphragm and sealingly secured at its circumferential edge to the marginal edge of said aperture in said diaphragm, a second valve normally biased to cover said aperture in said first valve, condition responsive means operably associated with said first and second valves to first open said second valve and then open said first valve additionally in proportion to further condition changes in the same direction, and a cover sealingly engaging said valve body and enclosing all of said valves.

4. A combination snap-acting and modulating fuel control comprising a housing having first, second and third chambers, a rigid wall between the first and second chambers, an opening through said wall, a valve positioned to seal and unseal said opening and normally biased to sealing position on said wall, an aperture through said valve, a movable wall including said first valve between said second and third chambers, a second valve positioned to seal and unseal said aperture in said first valve and normally biased to sealing position on said first valve, means responsive to a condition and operably associated with said first and second valves for snapping said second valve to its unsealing position and thereafter gradually moving said first valve to its unsealing position in accordance with further changes in said condition in the same direction, and a passage extending from said third chamber to said second chamber.

5. The combination defined in claim 4, wherein said means operably associated with said first and second valves has an adjustable lost motion connection to vary the amount of relative movement between said means and said first valve before said first valve is caused to be moved by said means.

6. A combination fuel valve comprising a valve body having an inlet and an outlet with a valve seat therebetween, an opening in said body opposite said valve seat, a diaphragm extending across said opening and having an aperture therein, a first valve having an aperture therein and positioned in said aperture in said diaphragm and sealingly engaging said diaphragm, said first valve being normally biased into engagement with said seat, a cover over said valve and having a portion sealingly engaging said diaphragm around said opening, a passage extending from the interior of said cover to either said inlet or said outlet, a second valve positioned to cover and uncover said aperture in said first valve and normally biased to cover said aperture, and condition responsive means for sequentially actuating said valves and to permit said first valve to close before said second valve is permitted to close.

7. A combination snap-acting and modulating fuel control comprising a housing having first, second and third chambers, a rigid wall between the first and second chambers, an opening through said wall, a first valve positioned to seal and unseal said opening and normally biased to sealing position on said wall, an aperture through said valve, a movable wall including said first valve between said second and third chambers, a passage between said second and third chambers, a second valve positioned to seal and unseal said aperture in said first valve and normally biased to sealing position on said first valve, and condition responsive means for sequentially actuating said valves to their open and closed positions, said means being so arranged as to hold said second valve open when said first valve is held open and to permit said first valve to close before said second valve is permitted to close.

8. A combination snap-acting and modulating fuel control comprising a housing having first, second and third chambers, a rigid wall between the first and second chambers, an opening through said wall, a first valve positioned to seal and unseal said opening and normally biased to sealing position on said wall, an aperture through said valve, a movable wall including said first valve between said second and third chambers, a second valve positioned to seal and unseal said aperture in said first valve and normally biased to sealing position on said first valve, a restricted passage extending from said third chamber to said second chamber, and condition responsive means for sequentially actuating said valves to their open and closed positions, said means being so arranged as to hold said second valve open when said first valve is held open and to permit said first valve to close before said second valve is permitted to close.

9. A fluid flow control device comprising a housing having a first chamber, a second chamber, and a third chamber therein, and a restricted passage formed in said housing between said third chamber and one of said first and second chambers; a pair of valves controlling fluid flow between said first and second chambers with said fluid flow between said chambers being through said third chamber and said restricted passage when only one of said valves is open; means for biasing each of said valves to its closed position; means movable gradually in response to variation of a controlling condition and capable of producing force for actuating the valves against the force of their bias; means for applying said actuating force to both of the valves concurrently, said force-applying means being yieldable so that the force effective to actuate each valve is determined by the amount of actuating force applied to the valve relative to the resistance of the valve to movement; and snap-acting means between said force-applying means and the valve that has the smaller valve closing bias.

References Cited in the file of this patent
UNITED STATES PATENTS

| | | |
|---|---|---|
| 870,597 | Tshopik | Nov. 12, 1907 |
| 908,224 | Eckland | Dec. 29, 1908 |
| 1,722,666 | Keith | July 30, 1929 |
| 1,835,974 | Shivers | Dec. 8, 1931 |
| 1,988,956 | Newell | Jan. 22, 1935 |
| 2,073,751 | Niesemann | Mar. 16, 1937 |